United States Patent Office 3,396,803
Patented Aug. 13, 1968

3,396,803
AUTOMATIC DEPTH CONTROL DEVICE FOR TRACTOR-HAULED AGRICULTURAL IMPLEMENTS
Antonio Corni, Turin, Italy, assignor to Fiat Società per Azioni, Turin, Italy
Filed June 28, 1965, Ser. No. 467,578
Claims priority, application Italy, July 10, 1964, 15,596/64
3 Claims. (Cl. 172—7)

ABSTRACT OF THE DISCLOSURE

A fluid distributing valve controlled by one of the three-point hauling levers of a tractor for automatically controlling a servomotor which operates the other two hauling levers. A valve control member is provided having adjustable means for adjusting the amount of displacement necessary to move the control member from the fluid feed to the fluid discharge position.

This invention relates to a device for adjusting the load response of depth control device for tractor-hauled agricultural implements.

In order to haul the agricultural implement engaged by the soil, the tractor should develop a force proportional to the depth of the furrow and compactness of the soil. In order to maintain the hauling force of the tractor at an approximately constant value, the agricultural implement is automatically lifted or lowered so as to cut in more compact soil a shallower furrow than in less compact soil.

To this end it is known to attach the agricultural implement to a lifting gear comprising three substantially parallel levers arranged at the corners of a triangle and articulated by their ends to the rear of the tractor and to the agricultural implement, respectively.

Two such levers, arranged at the base of the triangle, are driven by a servomotor adapted to lift or lower the said levers and the agricultural implement with respect to the tractor. The third lever, which is arranged at the apex of the triangle, is pivoted to a support secured to the rear of the tractor by means of a spring which is deformed proportionally to the effort exerted by the tractor in hauling the agricultural implement engaged in the soil. The deformations of the said spring operate through a suitable drive the servomotor control valve.

The load response of heretofore known apparatus depends exclusively upon the sensitivity of the spring mounted on the elastic support.

However, such apparatus are not responsive to variations either in weight of the implement or in the kind of work to be performed.

Experiments carried out by applicant revealed that a lifting device having a sensitivity adequate to a given implement weight, may become excessively sensitive when connected with a heavier implement, which may result in a pronounced overstep adjustment process of the control or, at least, in a too frequent intervention of the hydraulic control, which are both bothersome to the driver and detrimental to the life of all the components of the lifting device.

This invention provides a lifting device of the above mentioned type provided with means which are capable of adjusting within wide limits the depth control and readiness of intervention of the lifting device.

This invention further provides a simple control of the said means in order to facilitate adaptation to the load response of the lifting device.

With the above and further objects in view this invention provides a lifting device for an agricultural implement hauled by a tractor, of the type referred to above, having the characteristic feature that the lifting device is controlled by a valve provided with means operated from the outside, adapted to vary the width of displacement to be performed by the control member for the said valve in order to move the latter from its first position in which a pressure fluid is fed to a servomotor driving the device, to its second position of discharging the fluid from the said servomotor.

The invention will be described with reference to the accompanying drawings which show an embodiment thereof by way of example, and wherein.

Figure 1:
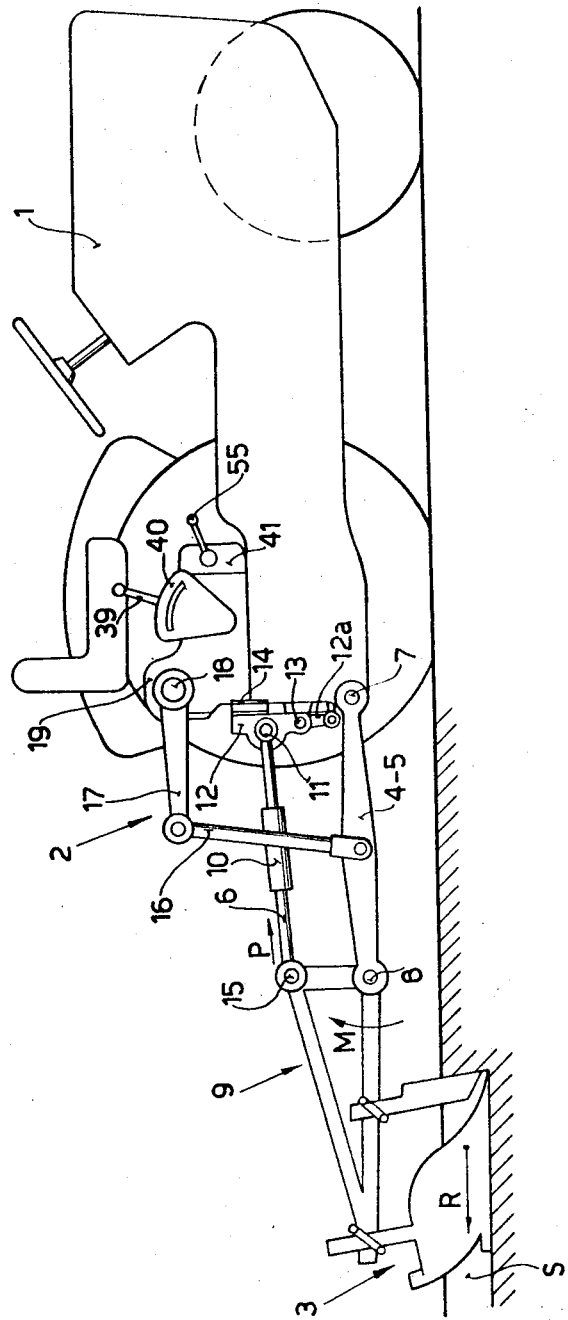
FIGURE 1 is a diagrammatical view of a tractor provided with a known lifting device for a plough.

Referring to the drawings, 1 denotes the tractor provided with a known lifting device 2 having attached thereto an agricultural implement 3, represented by a plough cutting a furrow S in the soil. The lifting device 2 comprises three levers 4, 5, 6 which extend substantially parallel and are arranged at the corners of an isosceles triangle.

The levers 4 and 5, arranged at the base of the triangle, have their ends pivoted to the rear of the tractor by pivots 7, the opposite lever ends being pivoted by pivots 8 to the frame 9 of the plough 3.

The third lever 6, arranged at the apex of the triangle is provided with a screw threaded coupling 10 by which the length of the lever can be varied.

The lever 6 is pivoted at one end to a pivot 11 secured to the intermediate portion of a support in the form of a two-armed lever 12, 12a pivoted by a pivot 13 to the rear of the tractor 1. The end of the arm 12 is secured to the tractor by means of a U-shaped spring 14, so that the lever 12, 12a can swing about the pivot 13, thereby deforming the spring 14.

The other end of the lever 6 is pivoted to the frame 9 by means of a pivot 15.

The intermediate portion of the lever 4, has pivoted thereto one end of a rod 16, the other end of which is pivoted to an arm 17 keyed to a shaft 18 rotatably mounted in a bearing 19 secured to the rear of the tractor 1.

An arm 20 is carried by the shaft 18 and is connected with the rod 21 of a hydraulic servomotor 22 having a piston 23 movable in a cylinder 24. The cylinder 24 is connected by a feed conduit 25 and a discharge conduit 26 to a valve 27 comprising a movable control member 28.

The valve 27 is connected in turn by a conduit 29 with a feed pump 30, drawing oil from a sump 31, to which the valve 27 is additionally connected by a discharge conduit 32.

The control member 28 is operatively connected with the lever on the support 12 by a drive comprising a rod 33 having one end articulated to the arm 12a and its other end articulated to an arm of a beam 34, the other arm of which is connected by a rod 35 to an arm 36 secured to the control member 28. The beam 34 is pivoted to a crank 37 eccentrically supported by a shaft 38 which can be rotated about its axis by manually displacing a lever 39 within the limits defined by a quadrant 40.

Figure 3:
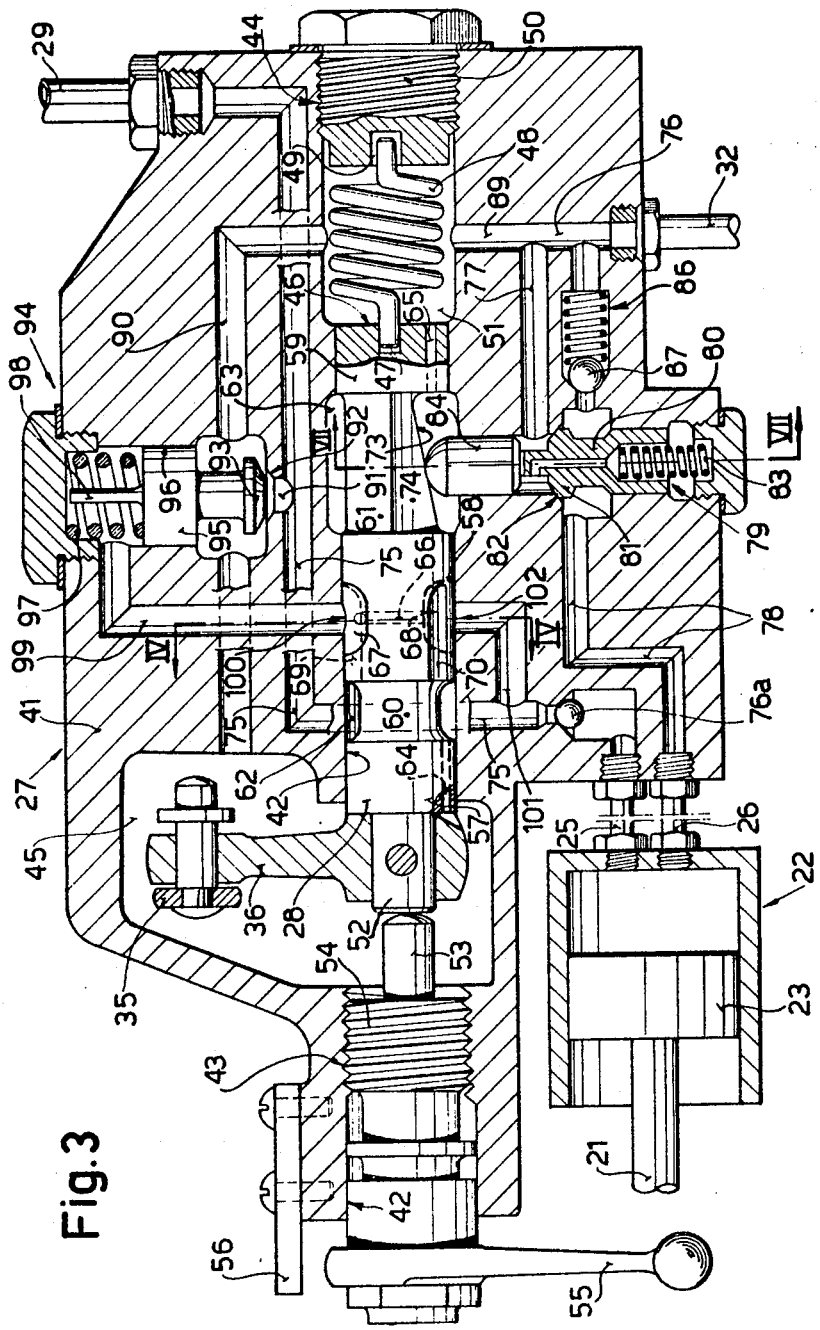
FIGURE 3 is a sectional view of the valve constituting the device according to this invention.

The valve 27 is diagrammatically shown in FIG. 3 in which, for the sake of clearness of the drawing, all conduits are shown in the plane of the drawing.

The valve comprises a body 41 having a bore 42, which is provided with screw threaded sections 43, 44 at both end portions and with a chamber 45 situated transversely and intermediate said threaded sections 43, 44.

A control member 28 is rotatably and slidably mounted in the bore and the lever 36 secured to an end pin 52 of the member 28 is accommodated in the chamber 45, formed with an aperture in its wall (not shown) through which the rod 35, effecting rotation of the control member 28 sealingly extends.

The end 46 of the control member is formed with a slit 47 engaging one end of a coiled spring 48, the other end of which is engaged by a slit 49 cut in a threaded plug 50 screwed into the threaded section 44 to seal one side of the bore 42 and to form in the latter a chamber 51.

The spring 48 biases the end of the pin 52 of the control member 28 against an axially displaceable abutment formed by a stop 53, securely fixed to a screw 54, screwed into the threaded section 43 to seal the other end of the bore 42.

The screw 54 is provided with a hand operated lever 55, by means of which the screw 54 can be rotated, thereby axially displacing the control member.

In order to prevent unscrewing of the screw 54, the rotation of the lever 55 is limited by a stop 56 secured to the valve body 41.

The control member 28 comprises three cylindrical portions 57, 58, 59 matching in diameter the bore 42, spaced by two cylindrical reduced portions 50, 61 which form annular grooves 62, 63.

The cylindrical portions 57, 59 situated at the ends of the member 28 are each formed with an axial bore 64, 65 connecting with corresponding annular grooves 62, 63, while the intermediate cylindrical portion 58 is formed with a diametral passage 66 having axially elongated ports 67, 68 (FIG. 4) and with two axial grooves 69, 70 arranged on diametrally opposite sides of the cylindrical portion 58 and connecting with the annular groove 62. The groove 69 is spaced from the port 67, by a land 71 and the groove 70 is similarly spaced from the port 68 by a land 72.

The cylindrical portion 61 is formed with an incline 73 sloping to the longitudinal axis of the control member 28 and presents a bevel 74 on one of its edges, so that a cylindrical surface 85 is present on part circumference only of the portion 61.

The feed conduit 29 is connected to the conduit 25 by a conduit 75 bored in the body 41 of the valve 27 and controlled by a check valve 76a, while conduits 76, 77, 78, connecting the discharge conduit 32 with a conduit 26 are controlled by a valve 79.

The normally closed valve 79 comprises a piston 80 having mushroom-shaped valve member 81 biased against a seat 82 by the fluid pressure in the conduit 78 and by a spring 83 in order to intercept communication between the conduits 78 and 77.

On the side remote from the spring 83 the piston 80 is provided with an actuating member in form of a finger 84, the longitudinal axis of which is eccentrically arranged relatively the rotational axis of the control member 28.

Figure 6:
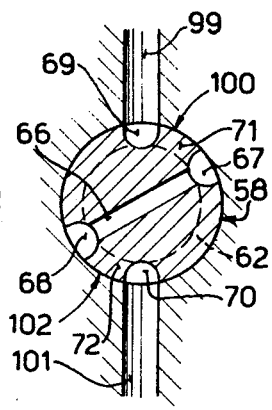

The finger 84 freely protrudes into the groove 63 by an extent such that the valve 79 is maintained closed and the finger 84 results spaced from the bevel 74, when it is turned towards the finger 84 (FIGURE 6). Consequently, the valve 79 remains closed.

Figure 8:
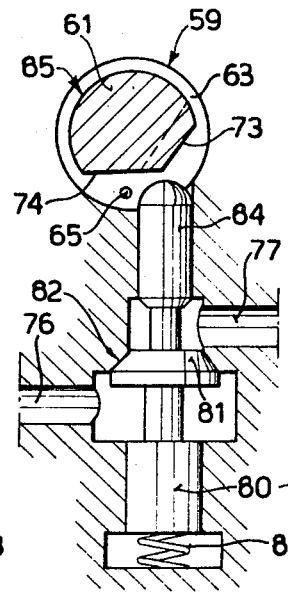

Rotation of the control member 28 in a clockwise direction brings the incline 73 to a position in which it contacts the finger 84 (FIGURE 8). On further rotation of the member 28 the incline 73 (FIGURE 9) depresses the finger 84 in order to open the valve 79. A still further rotation of the member 28 brings the cylindrical surface 85 of the portion 61 to contact and depress the finger 84, whereby the valve 79 remains open.

The valve 27 and servomotor 22 are protected against excessive pressures by a bypass 86 controlled by a spring loaded valve 87 which directly interconnects the conduits 78 and 76.

The conduit 76 is connected by a conduit 89 with the chamber 51 enclosing the spring 48, the said chamber being connected with the chamber 45 by a conduit 90, the latter connecting with the conduit 75 through a port 91 provided on the side facing the conduit 90 with a seating 92 for a mushroom-shaped valve member 93 of a valve 94.

The valve member 93 is securely fixed to a piston 95 arranged in a cylinder 96 exceeding in diameter the bore 91.

The valve member 93 is biased against its seat 92 by a spring 97, interposed between the piston 95 and the bottom of the cylinder 96, the stroke of the piston 95 in an opposite direction being limited by stop 98.

The portion of the cylinder 96, containing the spring 97, is connected with the bore 42 by a conduit 99, having a port 100 open into the bore 42.

The bore 42 is connected with the conduit 75 by a conduit 101 having a port 102 opening into the bore 42 diametrally opposite the port 100. Depending upon the position taken by the control member 28, the port 100, either connects with the port 67, or is closed by the land 71, or connects with the groove 69. Simultaneously, the port 101 either connects with port 68, or is closed by the land 72, or connects with the groove 70.

Figure 2:
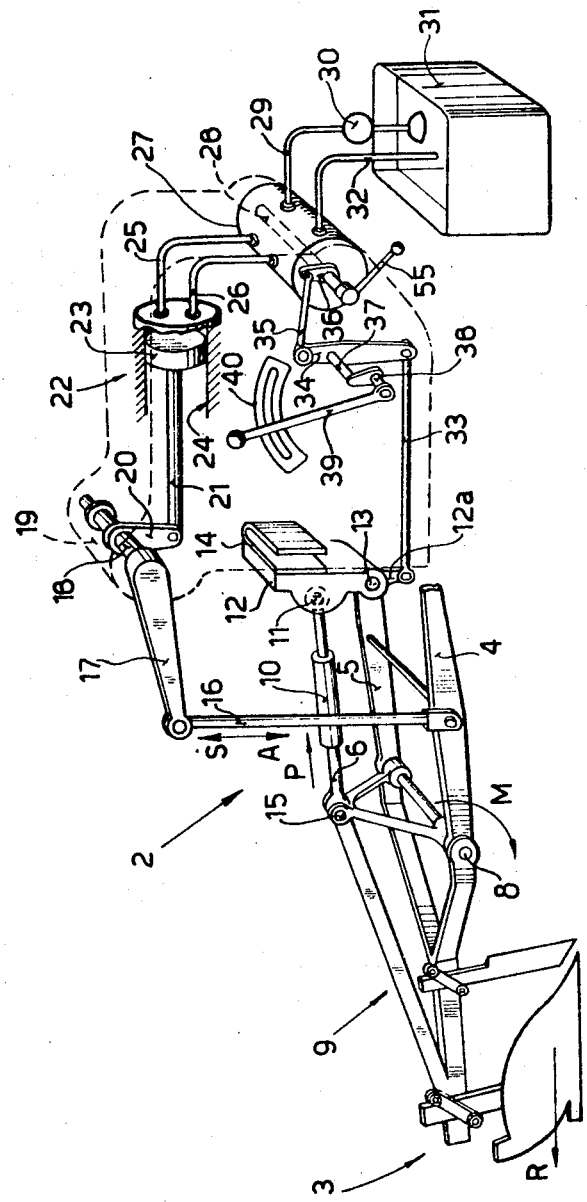
FIGURE 2 is a diagrammatical view of the control for the lifting device.

The above described device operates as follows. The reaction R (FIGURES 1, 2) of the plough 3 hauled by the tractor and set to cut the furrow S, generates a moment M about the pivots 8 and a force P, which by pushing the lever 12 compresses the spring 14 until the reaction of the spring 14 equals the force P.

The deformation of the spring 14 is transmitted by levers 12, 12a, rod 33, beam 34, rod 35 and arm 36 to the control member 28 of the valve 27.

Figure 4:
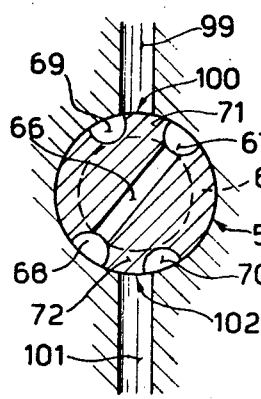
FIGURES 4, 5 and 6 are sectional views on line IV—IV of FIGURE 3, showing the mutual position of the parts in various operative conditions.
Figure 7:
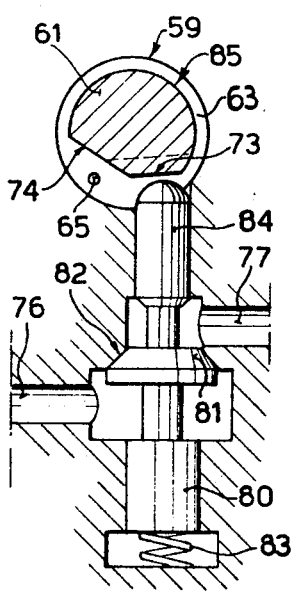
FIGURES 7, 8, 9 are sectional views on line VII—VII of FIGURE 3 in corresponding operative conditions.

By acting on the lever 39 the valve 27 is moved to its neutral position, in which the control member 28 is in the position shown in FIGURES 4 and 7.

In this position the grooves 69 and 70 of the cylindrical portion 58 partly uncover the ports 100, 102 and connect the respective conduits 99, 101 with the annular groove 62, connecting through the axial bore 64 with the chamber 45 which communicates through conduit 90 with the discharge conduit 32. Thus, the feed pressure of oil in the conduit 75 acts through the port 91 on the valve member 92 to open the valve 94, thereby lifting the piston 95 against the action of the spring 97 and emptying the cylinder 96 through the conduit 99.

Consequently, the pressure oil flows from the conduit 75 through port 91 to the conduit 90 and to the discharge conduit 32. Following the falling of pressure in the conduit 75, the valve 76a closes to prevent a discharge of oil flow from the servomotor 22 through the conduit 25.

At the same time the incline 73 is spaced from the finger 84 and the spring 83 and oil pressure in the conduit 78 keep the valve 79 closed, preventing discharge of oil from the servomotor 22 which results hydraulically locked and holds the plough 3 at the desired depth of the furrow S.

In the event of an instantaneous rise in oil pressure in the cylinder 24 of the servomotor 22 above the predetermined limit, the valve 87 opens and oil is discharged into the oil sump 31 through conduits 26, 78, 86, 76 and 32.

Figure 5:
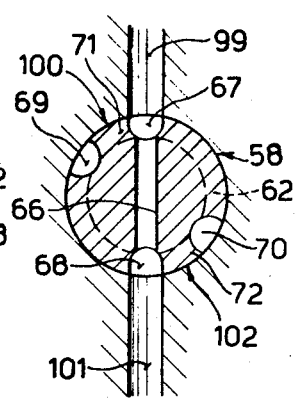

When the plough 3 cuts a more compact soil, the force P increases and by further compressing the spring 14, urges the rod 35 to the right (FIG. 2), and rotates the control member 28 towards its feed position shown in FIGURES 5 and 8.

The conduits 101 and 99 connect through the passage 66, so that oil is fed to the cylinder 96 and closes the valve 94. Consequently, the oil pressure in the conduit 75 rises, to cause the valve 76a to open and pressure oil is fed to the cylinder 24 of the servomotor 22, discharge of oil from the cylinder 24 of the servomotor 22 being prevented, inasmuch as a passage between the conduits 78 and 77 is intercepted by the valve 79, the finger 84 being spaced from the bevel 74 (FIG. 8).

In these circumstances, the rod 21 of the servomotor 22 acting on the arms 20, 17 and the rod 16 lifts the plough 3 till the force P sinks to its value corresponding to the predetermined compression of the spring 14 to return the valve 27 to its neutral position in which the servomotor is again hydraulically locked and the plough 3 forms a shallower furrow S.

Figure 9:
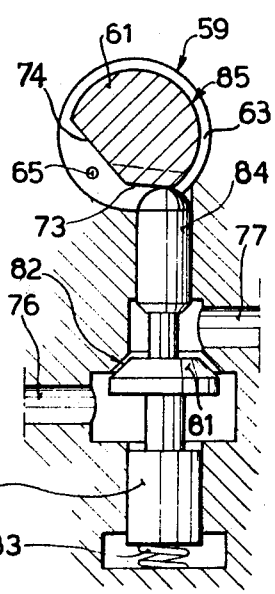

If the plough 3 encounter a less compact soil, the force P decreases, the spring 14 expands and moves the control member 28 of the valve 27 to its discharge position shown in FIGURES 6 and 9, in which the conduits 99 and 101 are connected by the grooves 67, 68 with the chamber 45 containing the oil at discharge pressure.

Consequently, the valve 94 is kept open and the valve 76a is closed as in the already described neutral position, while the incline 73, pressing on the finger 84 maintains the valve 76 open, whereby oil is discharged from the cylinder 24 of the servomotor 22 through the conduits 26, 78, 77, 76, 32 and the plough 3 is lowered till the force P and reaction of the spring 14 reach a fresh balance and return the valve 27 to its neutral position.

In order to vary the load response of the above described device means are provided to vary the width of the angular displacement to be performed by the control member 28 in order to move the valve 27 from its position in which pressure oil is fed to the cylinder 24 of the servomotor 22, into its position in which oil is discharged from the said servomotor.

By screwing in the screw 54 by means of the lever 55, the control member 28 is axially displaced against the action of the spring 48, and the thicker end of the incline 73 approaches the finger 84. This reduces the spacing between the incline 73 and finger 84 in the neutral position of the valve 27.

As a consequence, the incline 73 presses on the finger 84 in order to open the valve 79, after a smaller angular displacement of the control member 28.

Conversely, by unscrewing the screw 54 the spring 48 expands and axially displaces the control member 28 in opposite direction increasing the spacing between the incline 73 and finger 84 in the neutral position of the valve 27, so that the control member 28 has to perform a wider angular displacement to open the valve 79 and permit the discharge of oil from the servomotor 22.

What I claim is:

1. Automatic depth control device for tractor-hauled agricultural implements, of the type comprising three substantially parallel levers arranged at the corners of a triangle and having their ends articulated on one side to the rear of the tractor and on the opposite side to the agricultural implement, two of the said levers being operated by a hydraulic servomotor controlled by a distributing valve for a pressure fluid, said valve comprising a control member selectively displaceable to move the valve to a first, second and third operative position, said first operative position connecting said servomotor to a pressure fluid feed conduit, said second operative position connecting said servomotor to a discharge conduit and said third operative position closing off said servomotor from said feed and discharge conduits, said third position being situated intermediately of the first and second positions, the third lever being engaged by a support secured to the tractor by means of a spring deformable in proportion to the hauling force and connecting means interposed between said spring and valve control members whereby deformations of the spring are transmitted to said control member to move the valve to one of its three operative positions, said control member being further provided with additional means operable to vary the amount of displacement necessary by the control member in order to move said valve from its first operative position to its second operative position.

2. Device as claimed in claim 1, characterized by the fact that the valve control member is mounted for rotation and axial displacement in the body of the valve and comprises an incline securedly fixed to said control member and sloping to the axis of said member, a second valve controlling discharge of fluid from the cylinder of said servomotor and having an actuating member, said valve being arranged in the body of the valve such that, when the control member is in its third position, said incline is spaced from the actuating member of said second valve, means being provided for varying the spacing of said incline and actuating member.

3. Device as claimed in claim 2, characterized by the fact that the means adapted to vary the spacing of the incline and actuating member of said second valve comprises an abutment axially displaceable with respect to the body of the valve by means of a screw screwed into said body and operated from the outside of said body, and a spring arranged between one end of the control member and said valve body, adapted to axially urge said control member against said abutment.

References Cited

UNITED STATES PATENTS 3,194,319   7/1965   Faure  ---------------- 172—9

ABRAHAM G. STONE, *Primary Examiner.*

J. R. OAKS, *Assistant Examiner.*